US010511818B2

(12) United States Patent
Raffa et al.

(10) Patent No.: US 10,511,818 B2
(45) Date of Patent: Dec. 17, 2019

(54) CONTEXT AWARE PROJECTION (71) Applicant: Intel Corporation, Santa Clara, CA (US)

(72) Inventors: Giuseppe Raffa, Portland, OR (US); Carl S. Marshall, Portland, OR (US); Selvakumar Panneer, Portland, OR (US); Glen J. Anderson, Beaverton, OR (US); Meng Shi, Hillsboro, OR (US); Sangita Ravi Sharma, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 15/472,497

(22) Filed: Mar. 29, 2017

(65) Prior Publication Data

US 2018/0288380 A1 Oct. 4, 2018

(51) Int. Cl.
| | |
|---|---|
| H04N 9/31 | (2006.01) |
| G06F 3/042 | (2006.01) |
| G06F 3/16 | (2006.01) |
| G10L 25/78 | (2013.01) |
| G10L 15/18 | (2013.01) |
| G10L 15/02 | (2006.01) |
| G06F 21/10 | (2013.01) |
| G06F 16/58 | (2019.01) |
| G06F 3/0488 | (2013.01) |
| G10L 25/00 | (2013.01) |

(52) U.S. Cl.
CPC .......... *H04N 9/3194* (2013.01); *G06F 3/042* (2013.01); *G06F 3/0425* (2013.01); *G06F 3/0488* (2013.01); *G06F 3/167* (2013.01); *G06F 16/5866* (2019.01); *G06F 21/10* (2013.01); *G10L 15/02* (2013.01); *G10L 15/18* (2013.01); *G10L 25/78* (2013.01); *H04N 9/3179* (2013.01); *G06F 2221/0713* (2013.01); *G10L 25/00* (2013.01)

(58) Field of Classification Search
CPC ...................................................... H04N 9/3194
USPC .......................................................... 348/180
See application file for complete search history.

(56) References Cited

U.S. PATENT DOCUMENTS

| | | | |
|---|---|---|---|
| 8,840,250 B1* | 9/2014 | Yao | G01S 17/46 345/633 |
| 2009/0322678 A1* | 12/2009 | Lashina | G06Q 30/02 345/158 |
| 2017/0031530 A1* | 2/2017 | Ikeda | G03B 17/54 |
| 2018/0007341 A1* | 1/2018 | Okuley | H04N 13/02 |
| 2018/0096529 A1* | 4/2018 | Menard | G06F 3/011 |

* cited by examiner

Primary Examiner — Jefferey F Harold
Assistant Examiner — Justin Sanders
(74) Attorney, Agent, or Firm — Schwegman Lundberg & Woessner, P.A.

(57) ABSTRACT

In some embodiments, the disclosed subject matter involves a system for mapping projection of content to surfaces in an environment. Groups of users in the environment are identified and surfaces in the environment are selected/assigned for projection and/or touch input based on user preferences, ranking of surfaces for projectability or touchability, content to be displayed, proximity of user groups to one another and surfaces, and user feedback and control. Other embodiments are described and claimed.

25 Claims, 4 Drawing Sheets

CONTEXT AWARE PROJECTION

TECHNICAL FIELD

An embodiment of the present subject matter relates generally to projecting on a surface, and more specifically, to using context of users, environment and content to select both display services and touch input surfaces for the users.

BACKGROUND

Various mechanisms exist for projecting content on a display. Existing methods for interaction with a display are constrained to personal devices such as PCs, smart phones and wearables. Existing methods suffer from issues specific to personal devices such as small screens, cumbersome interaction mechanisms, inability to help the user in collaborative activities, and difficulty in determining and taking into account holistically the user context given the limited sensing abilities

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art that the present subject matter may be practiced without these specific details, or with slight alterations.

An embodiment of the present subject matter is a system and method relating to context aware projection. System and methods as described herein enable the automatic, implicit selection of the best surfaces that may be used in a given smart space, which are compatible with the user's task at hand and situational context. In cases where multiple groups are present in the same smart room and multiple projection systems and surfaces are present, the system may identify the best possible matching of surfaces and groups.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment, or to different or mutually exclusive embodiments. Features of various embodiments may be combined in other embodiments.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Figure 1:
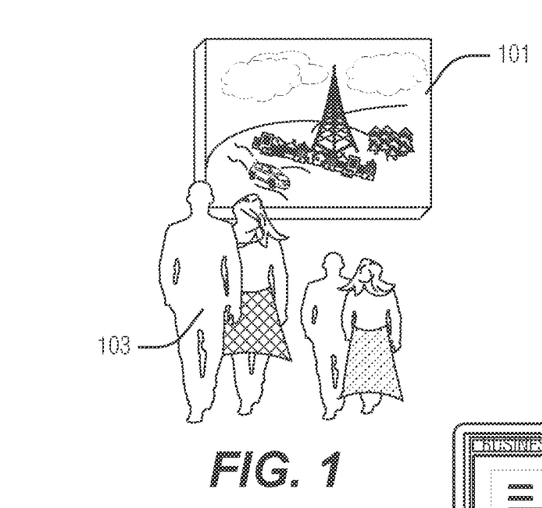
FIG. 1 is a diagram illustrating users viewing a picture or a movie on a projected display, according to an embodiment.

FIG. 1 is a diagram illustrating users 103 viewing a picture or a movie on a projected display 101 in their home, according to an embodiment. In an example, during a party attendees may gather in groups around the living room of a house, and varying groups may desire to view different content. The content may be projected onto various surfaces. A surface suitable for viewing content may be referred to as a display surface, or a projected display, herein. At a social gathering it is typical for multiple groups of friends and family to form depending on common interests and topics being discussed. For instance, children may be talking about the latest movie, and adults may be talking about sports or food related topics. Other examples of how users gather around the display surfaces, with projected content, are shown in FIGS. 2-4.

Figure 2:
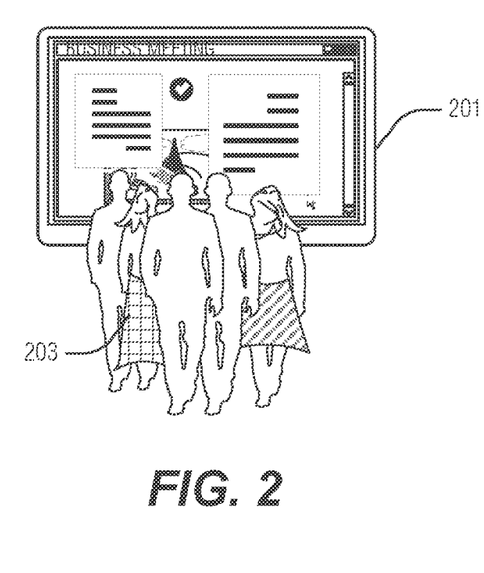
FIG. 2 is a diagram illustrating a group of users viewing a business meeting on a projected display, according to an embodiment.
Figure 3:
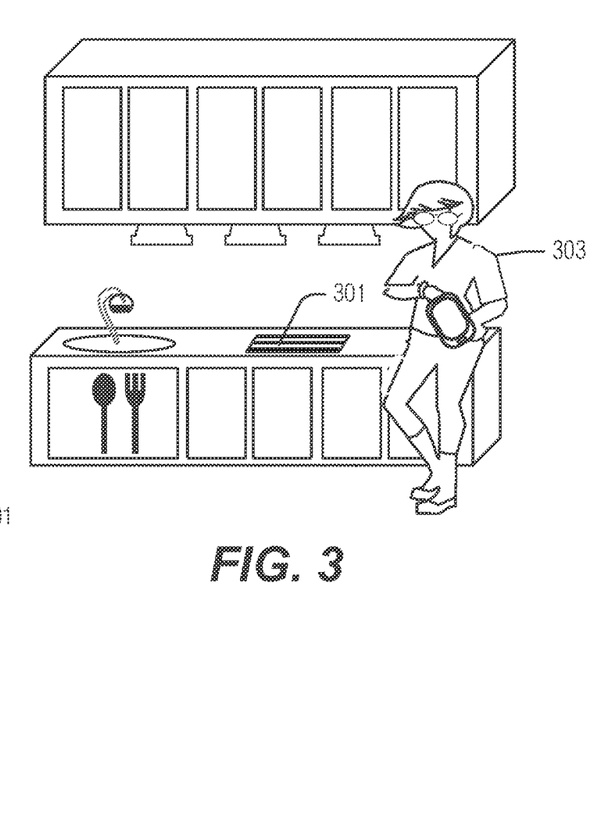
FIG. 3 is a diagram illustrating a user in a kitchen viewing a receipt projected on a display surface, according to an environment.

FIG. 2 is a diagram illustrating a group of users 203 viewing a business meeting content on a projected display 201, according to an embodiment. FIG. 3 is a diagram illustrating a user 303 in a kitchen viewing a receipt projected on a display surface 301, according to an embodiment. FIG. 4 is a diagram showing two groups of users 403, 407 viewing different projected displays 401, 405 in the same room, according to an embodiment.

Figure 4:
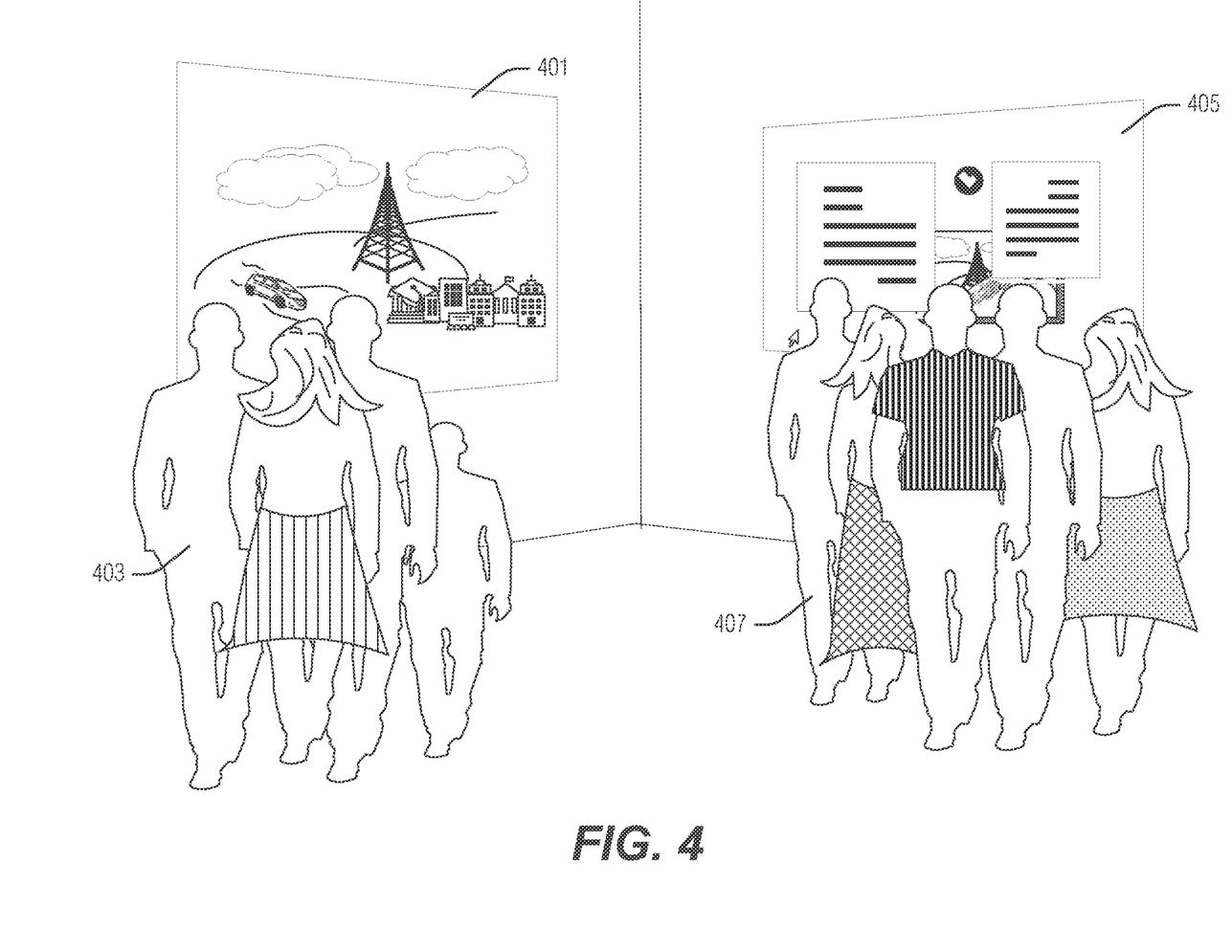
FIG. 4 is a diagram showing two groups of users viewing different projected displays in the same room, according to an embodiment.

Because the projected content shown in FIGS. 1-4 are different, the optimal viewing, or display surfaces may be different for the respective content. For instance, in FIG. 1 the users are trying to watch a movie on display surface 101. Because of the movie context, lighting conditions in the room are important to the users' experience. For instance, if there is glare coming from a window in the room directed towards the users' location and field of view, then the projection would be optimally displayed on another surface that has less glare, or reflectivity. Also, for example, the display in FIG. 2 is to shown as being used for a business discussion. Much of the presentation might be in black and white with high contrast. Thus, a glare condition would not be as critical. However in this example, the number of users may be taken into account as to which surface to project for the display so that all of the users can comfortably see the screen and provide feedback on the presentation, as well as the presenter comfortably interact with the surface to control the content. Also, for example, FIG. 3, a receipt or recipe 301 is projected on a kitchen counter. If the user 303 in this kitchen is cooking, and the content is to provide a recipe, then an optimal surface would be selected somewhere close to the work surface in the kitchen, but not obscured with cooking utensils or messy food preparation debris. The context of the item to be displayed may drive where in the kitchen it will be displayed for the user. Also, for example, FIG. 4 illustrates a room with two different groups 403 and 407 viewing projected displays 401 and 405, respectively. In this example, projected display 401 is showing a video or movie and projected display 405 is a showing business meeting content. For example, the movie may be best viewed on a wall without glare and business meeting content projected at 405 may best be displayed on a longer wall surface, based on the volume of information to be displayed. In an example, the displays are mapped to surfaces based on where the users have congregated in the room. However, in an embodiment, if the mapping to those surfaces is not optimal, a notice to the users may be provided to have everyone congregate in a different part of the room because the surfaces are to be remapped for optimal viewing.

In a smart space, the environment may react to different contexts, because different groups in the same physical space may have different need. Users or groups may also provide information, either on demand or proactively as to preferences or feedback related to the display surfaces. The projection system may use qualitative and quantitative measures about the available surfaces and environmental conditions (e.g., glare, ambient noise, etc.), viewing angle, user or group orientation, as well other contextual information regarding formed groups, group leaders, user preferences for viewing and/or providing control and feedback input, privacy concerns, etc. As conditions change, the projection system continues to provide projected displays to accommodate the changing environment, in order to achieve the best possible experience for the users. For example, in a space that has projection capabilities, the system may project on surfaces that have the best projection attributes (e.g., provide high resolution and high contrast display with minimal bleed, accurate colors, etc.), are close to the group, and have suitable orientation for viewing. For instance, a soft pillow with a plaid pattern may be inherently a poor choice as a display surface (poor projection attributes based on surface characteristics), whereas, a flat matte wall may be inherently a better surface to provide truer colors and crisp resolution (better projection attributes based on surface characteristics). A curved surface facing somewhat away from a group of users, and far away, may be a poorer orientation than a flat horizontal surface, such as a table directly in front of the group. In some examples, user or group control or feedback may be desired during the content projection. Therefore, the projection system may also enable touch input on surfaces that have the acceptable accuracy for touch interaction and are close enough for a user to interact with the touch surface easily.)

Figure 5:
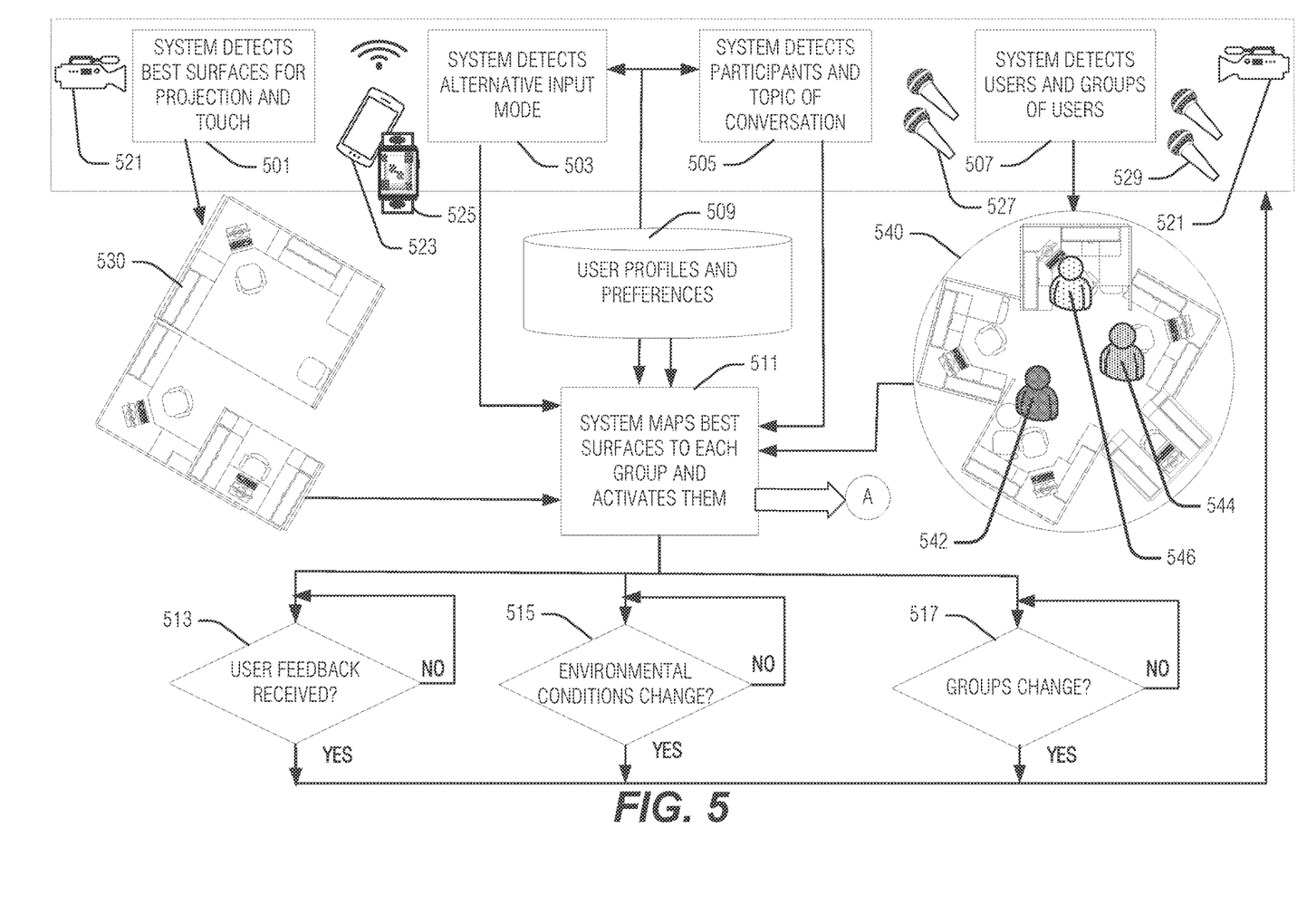
FIG. 5 is a flow diagram illustrating a method for context aware projection, according to an embodiment.

FIG. 5 is a flow diagram illustrating a method for context aware projection, according to an embodiment. A context aware projection system may detect the best surfaces available for projection and touch in block 501. Optimal selection for projection and touch may be realized by using information known about the available surfaces in the environment and also being able to score or rank them for projectability and touchability. Selection may be dynamic based on a changing environment, changing groups or changing content. The context aware projection system may also detect groups and clusters of people who form in an area in the physical space that are actively engaged in either a conversation, activity, or task. Identification of the activity being performed by each group may be automated based on contextual characteristics and behavior exhibited by the group. Users' relative orientation with respect to each other, and with respect to the room surfaces, is also taken into consideration by this system.

An embodiment utilizes a number of subsystems, modules or logic components for context aware projection. Surface identification and ranking logic 501 may detect and score best surfaces for projection and touch, based on various inputs such as position and orientation with respect to camera 521. The surface identification and ranking logic may also take into account light conditions, occlusions, etc. In an example, if the surface is highly reflective, bright light in the environment may cause glare and make content projected on the surface difficult to see. In an example, there may be objects in the line of sight between a user and the surface that occlude, or obscure the user's view of content displayed on the surface. The surface identification and ranking logic 501 typically receives sensor input from camera 521. The surface identification and ranking logic 501 may also determine the optimal projection size and orientation to ensure that the content is readable from each users' point of view.

In an embodiment, the characteristics identification and ranking of surfaces may be predetermined and stored in a database accessible to the surface mapping logic 511. The room or environment 530, 540 may be pre-mapped based on the known surfaces in the room, and require only minor ranking modifications based on perceived changes, such as new or different furniture, papers or books coveting a surface, lighting conditions, etc. Dynamic mapping may be performed with camera 521 and an object recognition service, as well as a predictive mapping of surface types to viewability or projectability characteristics. Camera 521 may be a simple camera, 2D or 3D or depth camera, or an array of similar or dissimilar cameras. Various algorithms may be used to identify surfaces and their characteristics, such as reflectivity, curvature, hardness, etc. The pre-mapping or the dynamic mapping of the surfaces in the environment may be stored in a data store for use by the system mapping process 511.

The surface ranking logic in 501 may also rank the surfaces for touchability and ease-of-use as a touch input device. In an embodiment, the user may have a preference for a vertical touch input device rather than a horizontal touch input device, or vice a versa. The user's age, height or disability may be saved as well, under the user profile and preferences data in data store 509. For instance, a child is typically shorter than an adult and will not be able to reach a touch input that is too high. A shorter person, or a person in a wheelchair may also not be able to reach a high surface and those people might have a preference for a low horizontal touch input surface. In some cases, no suitable surface may be found for touch input. Therefore, alternative input mode detection logic 503 may search for and detect alternative input modes, or devices. This alternative input mode detection logic 503 may detect alternative input modes/devices such as a smart phone 523 or a smart watch 525 present in the environment. This alternative input mode detection logic 503 may detect alternative input modes/devices such as personal mobile and wearable devices of people in the room. This logic 503 may use a Wi-Fi network and a scan for devices, and pairing of such devices and their capabilities may utilize common discovery protocols (e.g., UPnP, etc.). Logic 503 may also query the user profile and preferences data store 509 to determine whether a particular user has a preference for using one or more of their own devices or wearables rather than a touchable surface.)

A conversation detection logic 505 may listen to the environment audio signatures with microphone(s) 527 and detect participant's identities through speaker identification technologies. Topics of conversation may be learned or derived through automatic speech recognition/natural language processing (ASR/NLP). Personal audio signatures may also be present in the user profiles and preferences data store 509. Logic 505 may use a microphone array 527 as sensing technology and may be aided by a group detection logic 507.

A user and group detection logic 507 may detect groups in the environment by leveraging camera capabilities and clustering people into groups using machine vision techniques. Environment 540 illustrates three groups 542, 544, and 546. It will be understood that a group may consist of only one person or member, and that these groups, as illustrated may contain one or more members. This logic uses the camera(s) 521 and microphone(s) 529 as the main sensing mode for this subsystem. In an embodiment, audio signatures of individuals in the room may be used to determine their location, proximity clustering, common conversation, etc. to identify groups based on audio alone. In an embodiment, both vision and audio may be used to identify groups.

Observance of the users and their activities may be effected by cameras 521 in the environment. The users or groups may be tracked and followed around the room as they move in the environment, using computer vision techniques, directional audio, radio signals, fingerprinting, SLAM techniques, or similar.

Logic 501, 503, 505 and 507 may output data to be provided in a surface mapping system, or logic 511, that in turn optimizes the assignment of surfaces for both touch and projection to various groups. The surface rankings, alternative input modes/devices, conversation topics and user/group detection data may be stored in the data store 509, or collection of data stores, for use by the surface mapping logic 511, or be sent directly to the surface mapping system via a number of message processing or process to process communication techniques, or similar. The surface mapping logic 511 uses this data to find the best solution to the assignment, taking into consideration many surfaces, detected groups and distance/orientation, topics of conversation, and user preferences. Once an optimal solution has been detected, and the surfaces activated (with proper feedback to the users, for instance visual or audio), the context aware projection system monitors events including for feedback, changes in the environment, and changes in the user groups.

In an embodiment, the conversation topic for a specific group may be detected using ASR/NLP and be captured by microphones 527 or 529 in the environment, in block 505. Based on the topic of the conversation surface mapping in block 511 may select a surface for projection based on the content likely to be displayed, for instance a movie, picture, black and white text, etc. Different content may be better projected on different surfaces. The mapping to these preferences may be explicitly defined in a table, or similar data structure, and stored in memory, or be dynamically surmised based on a set of rules and using machine learning techniques. For example, black and white text may be acceptable for projection on a soft, curved surface like the arm of a couch. But a movie may be best projected on a flat, bright area like a wall.

In an embodiment, the projection and touch surfaces may be decoupled, or bifurcated, by mapping subsystem 511, in order to use the optimal surface for each of those modes. In many cases, the type of surface best used for touch may not be the surface selected for projection of content. In other cases, user preference dictates that the user's own device is to be preferred for touch input, and in other cases, user preferences may dictate audio input instead of touch input.

In an embodiment, using ASR/NLP the system may be able to determine the roles of the users within the group, in addition to conversation topic. For instance, based on certain keywords and tone or attitude of the speaker, the leader of the group may be identified, by the user and group detection logic 507. For instance, followers or students may be more likely to ask questions of the leader and they can then be identified through that sort of interaction. Once the role of the leader has been identified, a touch surface that is optimal for that person, for instance in close proximity with the leader, may be selected for touch. The leader's user preferences may be more heavily weighted in the selection of the projection surface. However, in an embodiment, the projection surface may be more optimal at a distance or different viewing angle best made for all of the members a the group and may be selected accordingly. If a suitable touch area cannot be determined, and a wearable or mobile device is detected on one or more users, these devices may be activated and paired so that they may be used as input to the system. For example, a user may perform an in-air inertial gesture and a near field audio. An ambient signal (audio, light, visual) or personal (haptic) may be given to the users to inform them that a particular input device or area has been enabled.

In an embodiment, the system may also recognize the individual participants or demographics of a group such as age (e.g., using speaker identification through voice) and load individual profiles and preferences (e.g., horizontal versus vertical surfaces, textured versus smooth, left versus right handed, light versus dark colors, etc.).

Multiple projection/touch surfaces or other special configurations may be selected as a large group is detected and no one single surface can be optimal for the entire group of people. Thus, the projection surfaces may replicate the same content, which is now visible to everyone in an optimal way. For multiple touch input surfaces, logic may be used so that only one of these surfaces is active at any given time, for example, based on who is speaking and determined to be the leader or controlling the system. Indication of the active surface may be given, and the command-and-control interface may be provided for explicit control.

In an embodiment, the same principle may be applied to non-planar objects. For example, the system may select convex objects such as cups, concave interior of the bowl, etc.

In a privacy aware embodiment, the system may be able to determine if the situational context of the user is public or private, and disable private content in the latter case. For example, the system may determine that unauthorized people are in the same room/group or in the vicinity of the user, such as may be seen in FIG. 4. With the additional detection of the identity of the users, more refined rules may be set up, e.g., enable/disable content for family versus friends versus work colleagues. In a private mode the content can be fully removed from the projection or only some sensitive parts may be obscured or redacted (e.g., birth date, Social Security number, . . . ).

User feedback is monitored in block 513. Feedback is in either implicitly monitored (e.g., listening for hints that mapping is not optimal), or explicitly monitored (e.g., command and control through audio, touch or gesture). When feedback is not received, the process continues to loop until it receives explicit or implicit feedback. When user feedback has been identified, the process loops back to the top, for further analysis.

In an embodiment, the context aware projection system may recognize that a user is uncomfortable when working with the selected surface, in response to, far instance, speech, posture, or movement feedback. If this system determines that the user has discomfort with that selected surface, the system may change it accordingly. In this example, a limited help from the user may also be desirable with typical command-and-control action (e.g., speech and or gestures) to select an alternative surface with high level meaning (that e.g., "bring the touch input closer to me", "not so high", etc.).

As environmental conditions change, such as lighting conditions, occlusions, etc. Those changes are fed back into the processes above so that the surfaces for display and touch may be remapped, if applicable. When there is no environmental change in block 515 polling continues.

Block 517 monitors groups and topics of conversation. Cameras 521 continue to monitor the environment and will capture users as they move from one group to another, or simply move around the room. Microphones 527 and/or 529 may help monitor conversations in the environment. As the groups change position, orientation or composition, or the topics of conversation may change, and those Changes are provided to logic 501-507 to enable block 511 to re-evaluate and remap the surfaces.

Figure 6:
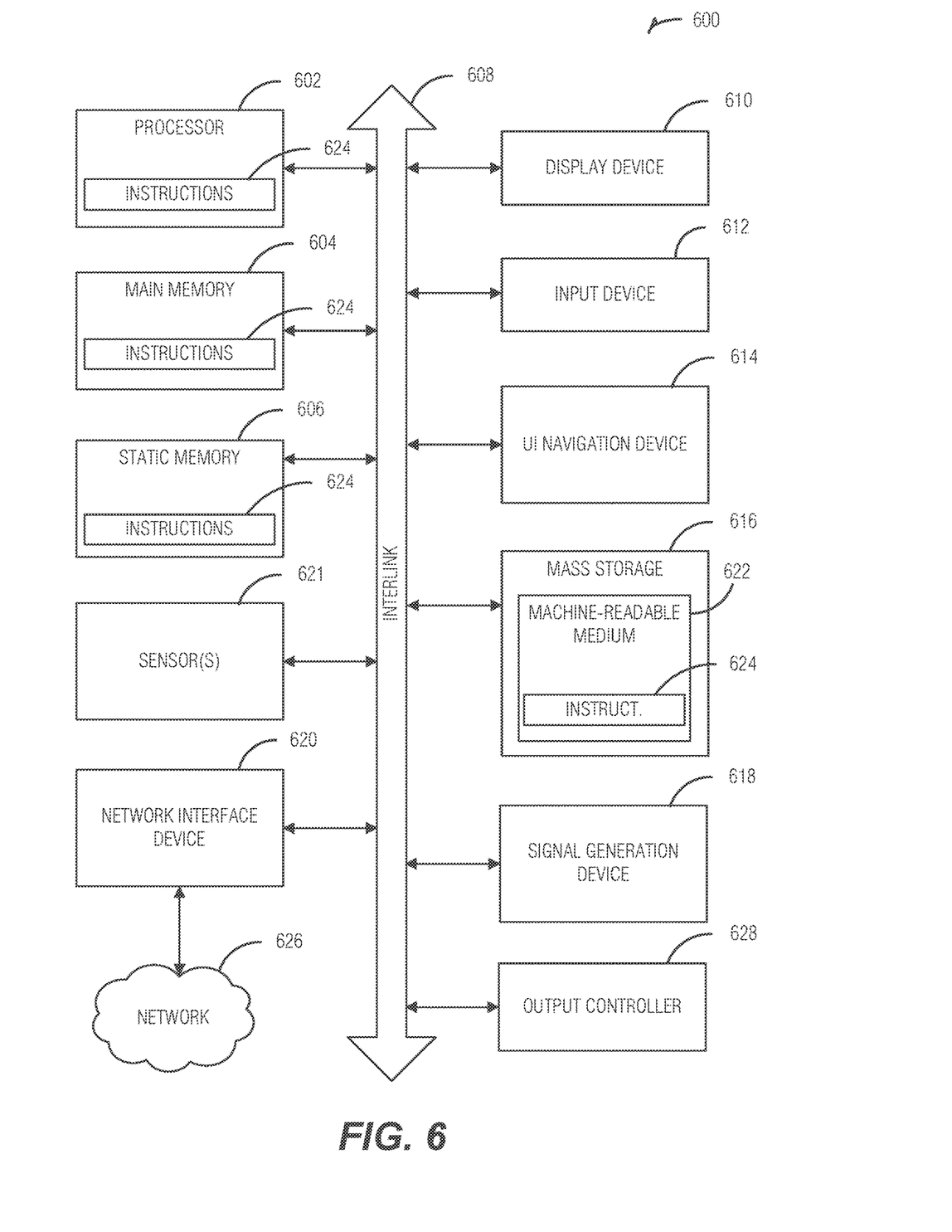
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired), in an example, the hardware of the circuitry may include variably connected physical components (e.g., execution units, transistors, simple circuits, etc.) including a computer readable medium physically modified (e.g., magnetically, electrically, movable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating, in an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on Which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data strictures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (LP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL NOTES AND EXAMPLES

Examples can include subject matter such as a method, means for performing acts of the method, at least one machine-readable medium including instructions that, when performed by a machine cause the machine to performs acts of the method, or of an apparatus or system for context aware projection, according to embodiments and examples described herein.

Example 1 is a system for context aware projection in an environment, comprising: a processor, when in operation communicatively coupled to: a camera in the environment, and a database for storing user preferences; surface mapping logic coupled to the processor, the surface mapping logic to access an image corresponding to a user in the environment, the image to identify a position of the user with respect to the camera and to a plurality of surfaces in the environment, the surface mapping logic to select a surface of the plurality of surfaces in the environment as an assigned surface, the assigned surface to be used in projection, wherein the assigned surface is selected based on a projectability ranking for the assigned surface with respect to projectability ranking of other surfaces in the environment, and wherein selection of the assigned surface is further based on preferences of the user stored in the database.

In Example 2, the subject matter of Example 1 optionally includes Wherein the selection of the assigned surface is further based on content to be displayed and proximity of the assigned surface to the user to view the projection.

In Example 3, the subject matter of any one or more of Examples 1-2 optionally include the camera to capture the image, the camera to provide the image to the surface mapping logic.

In Example 4, the subject matter of any one or more of Examples 1-3 optionally include a projector in the environment to display the content onto the assigned surface.

In Example 5, the subject matter of any one or more of Examples 1-4 optionally include wherein the projectability ranking includes criteria selected from the group consisting of: user position and orientation with respect to the surface, lighting conditions, reflectivity of the surface, line of sight occlusions of the surface, and readability from perspective of the user.

In Example 6, the subject matter of any one or more of Examples 1-5 optionally include wherein the image to further to identify an orientation of the user with respect to the camera and to the plurality of surfaces in the environment.

In Example 7, the subject matter of any one or more of Examples 1-6 optionally include wherein the surface mapping logic is further to assign an input device as an assigned input device for the user to provide commands or feedback to the context aware projection system, wherein the assigned input device is one of a touch surface in the environment or an alternative device.

In Example 8, the subject matter of Example 7 optionally includes wherein the alternative device is to accept at least one of touch or audio input.

In Example 9, the subject matter of any one or more of Examples 7-8 optionally include wherein to assign an input device is based on a touchability ranking of a plurality of touch surfaces in the environment, availability of the alternative device, and preferences of the user stored in the database.

In Example 10, the subject matter of any one or more of Examples 7-9 optionally include alternative device detection logic coupled to the processor, the alternative device detection logic to identify an alternative input device in the environment, and to determine an availability for the alternative input device, and to assign the alternative input device for use as the assigned input device based on availability of the alternative input device and the preference of the user.

In Example 11, the subject matter of any one or more of Examples 1-10 optionally include group detection logic coupled to the processor, to identify a location of the user in the environment and determine whether the user is proximate to another user, where proximate users form a cluster, the group detection logic to determine whether the cluster is a group, wherein the group includes members authorized to view a same projection, and when detecting presence of the group in the environment, include user preferences of users in the group when assigning the surface for projection.

In Example 12, the subject matter of Example 11 optionally includes wherein the group detection logic is to use signals captured by at least one of the camera or a microphone to identify a cluster of users and location of the cluster in the environment.

In Example 13, the subject matter of Example 12 optionally includes conversation detection logic to access audio signals from the microphone, the conversation detection logic further to detect speech within the audio signals using automatic speech recognition and natural language processing, wherein the detected speech is to assist in identification of whether users in a cluster are members of a group.

In Example 14, the subject matter of Example 13 optionally includes wherein the conversation detection logic is to identify a conversation within the group, and based on the conversation, to identify a leader of the group, and weight the leader's preferences more heavily than other users' preferences, in assigning at least one of the projection surface and a touch surface for input.

In Example 15, the subject matter of any one or more of Examples 11-14 optionally include change logic coupled to the surface mapping logic to determine Whether elements of at least one of the environment or identified groups has changed, the change logic to provide change information to the surface mapping logic to prompt the surface mapping logic to determine whether a projection surface is to be reassigned, based on the change information.

In Example 16, the subject matter of Example 15 optionally includes wherein the change logic is further to receive feedback from an input device, the feedback to provide user identified change information to be used in determining whether a projection surface is to be reassigned, wherein the input device is one of a touch surface in the environment or an alternative device.

In Example 17, the subject matter of Example 16 optionally includes wherein the surface mapping logic is further to assign the input device based on a touchability ranking of a plurality of touch surfaces in the environment, availability of the alternative device, and preferences of the user stored in the database.

In Example 18, the subject matter of any one or more of Examples 11-17 optionally include wherein responsive to the group detection logic having determined that there is more than one group in the environment, the surface mapping logic to assign a first surface to a first group and to assign a second surface to a second group, wherein to assign the first surface depends on projectability of the first surface and user preferences of members of the first group, and proximity of the first surface to both the first and second group, and wherein to assign the second surface depends on projectability of the second surface and user preferences of members of the second group, and proximity of the second surface to both the first and second group.

In Example 19, the subject matter of Example 18 optionally includes wherein the proximity of the first and second surface to the first and second group is dependent on privacy restrictions on content to be displayed on the first and second surface.

In Example 20, the subject matter of Example 19 optionally includes wherein the surface mapping logic is to assign surfaces to the first group and second group to ensure that privacy content is obscured, disabled or made unviewable to members of an unauthorized group of users.

Example 21 is a method for context aware projection in an environment, comprising: selecting a surface of a plurality of surfaces in the environment as an assigned surface, the assigned surface to be used in projection, wherein selecting the surface further comprises: identifying a projectability ranking for the assigned surface with respect to projectability ranking of other surfaces in the environment, identifying content to be displayed including authorization to view the content by the a user in the environment, determining proximity of the assigned surface to the user to view the projection, the determining proximity using an image of the environment captured by a camera in the environment, the image to identify a position and orientation of the user with respect to the camera and to the plurality of surfaces in the environment, and identifying preferences of the user stored in a database with respect to viewability parameters.

In Example 22, the subject matter of Example 21 optionally includes capturing the image by the camera.

In Example 23, the subject matter of any one or more of Examples 21-22 optionally include projecting the content on the assigned surface by a projector in the environment.

In Example 24, the subject matter of any one or more of Examples 21-23 optionally include wherein the projectability ranking includes criteria selected from the group consisting of: user position and orientation with respect to the surface, lighting conditions, reflectivity of the surface, line of sight occlusions of the surface, and readability from perspective of the user.

In Example 25, the subject matter of any one or more of Examples 21-24 optionally include assigning an input device as an assigned input device for the user to provide commands or feedback, wherein the assigned input device is one of a touch surface in the environment or an alternative device.

Example 26, the subject matter of Example 25 optionally includes wherein assigning the input device is based on a touchability ranking of a plurality of touch surfaces in the environment, availability of the alternative device, and preferences of the user stored in the database.

In Example 27, the subject matter of any one or more of Examples 21-26 optionally include identifying a location of the user in the environment; determining whether the user is proximate to another user, where proximate users form a cluster; determining whether the cluster is a group, wherein the group includes members authorized to view a same projection; and when detecting presence of the group in the environment, including user preferences of users in the group when assigning the surface for projection.

In Example 28, the subject matter of Example 27 optionally includes identifying a cluster of users and location of the cluster in the environment using signals captured by at least one of the camera or a microphone.

In Example 29, the subject matter of any one or more of Examples 27-28 optionally include determining that there is more than one group in the environment; assigning a first surface to a first group, based on projectability of the first surface and user preferences of members of the first group, and proximity of the first surface to both the first and second group; and assigning a second surface to a second group, based on projectability of the second surface and user preferences of members of the second group, and proximity of the second surface to both the first and second group.

In Example 30, the subject matter of any one or more of Examples 21-29 optionally include accessing audio signals from a microphone; and detecting speech within the audio signals captured by the microphone using automatic speech recognition and natural language processing, wherein the detected speech is to assist in identification of whether users in a cluster are members of a group.

In Example 31, the subject matter of any one or more of Examples 21-30 optionally include determining whether elements of at least one of the environment or identified groups has changed, resulting in change information; and responsive to a determined change, determining whether a projection surface is to be reassigned, based on the change information.

Example 32 is a system for context aware projection in an environment, comprising means for performing the method of any of Examples 21-31.

Example 33 is at least one computer readable storage medium having instructions stored thereon, the instructions when executed on a machine cause the machine to perform the method of any of Examples 21-31.

Example 34 is at least one computer readable storage medium having instructions stored thereon, the instructions when executed on a machine cause the machine to: select a surface of a plurality of surfaces in the environment as an assigned surface, the assigned surface to be used in projection, wherein selecting the surface further comprises instructions to: identify a projectability ranking for the assigned surface with respect to projectability ranking of other surfaces in the environment, identify content to be displayed including authorization to view the content by the a user in the environment, determine proximity of the assigned surface to the user to view the projection, the determining proximity using an image of the environment captured by a camera in the environment, the image to identify a position and orientation of the user with respect to the camera and to the plurality of surfaces in the environment, and identify preferences of the user stored in a database with respect to viewability parameters.

In Example 35, the subject matter of Example 34 optionally includes instructions to capture the image by the camera.

In Example 36, the subject matter of any one or more of Examples 34-35 optionally include instructions to project the content on the assigned surface by a projector in the environment.

In Example 37, the subject matter of any one or more of Examples 34-36 optionally include wherein the projectability ranking includes criteria selected from the group consisting of: user position with respect to the surface, user orientation with respect to the surface, lighting conditions, reflectivity of the surface line of sight occlusions of the surface, and readability from perspective of the user.

In Example 38, the subject matter of any one or more of Examples 34-37 optionally include instructions to: assign an input device as an assigned input device for the user to provide commands or feedback, wherein the assigned input device is one of a touch surface in the environment or an alternative device.

In Example 39, the subject matter of Example 38 optionally includes wherein assigning the input device is based on a touchability ranking of a plurality of touch surfaces in the environment, availability of the alternative device, and preferences of the user stored in the database.

In Example 40, the subject matter of any one or more of Examples 34-39 optionally include instructions to: identify a location of the user in the environment determine whether the user is proximate to another user, where proximate users form a cluster; determine whether the cluster is a group, wherein the group includes members authorized to view a same projection; and when detecting presence of the group in the environment, include user preferences of users in the group when assigning the surface for projection.

In Example 41, the subject matter of Example 40 optionally includes instructions to: identify a cluster of users and location of the cluster in the environment using signals captured by at least one of the camera or a microphone.

In Example 42, the subject matter of any one or more of Examples 40-41 optionally include instructions to: determine that there is more than one group in the environment; assign a first surface to a first group, based on projectability of the first surface and user preferences of members of the first group, and proximity of the first surface to both the first and second group; and assign a second surface to a second group, based on projectability of the second surface and user preferences of members of the second group, and proximity of the second surface to both the first and second group.

In Example 43, the subject matter of any one or more of Examples 34-42 optionally include instructions to: access audio signals from a microphone; and detect speech within the audio signals captured by the microphone using automatic speech recognition and natural language processing, wherein the detected speech is to assist in identification of whether users in a cluster are members of a group.

In Example 44, the subject matter of any one or more of Examples 34-43 optionally include instructions to: determine whether elements of at least one of the environment or identified groups has changed, resulting in change information; and responsive to a determined change, determine whether a projection surface is to be reassigned, based on the change information.

Example 45 is a system for context aware projection in an environment, comprising: means for selecting a surface of a plurality of surfaces in the environment as an assigned surface, the assigned surface to be used in projection, wherein the mean, for selecting the surface further comprise: means for identifying a projectability ranking for the assigned surface with respect to projectability ranking of other surfaces in the environment; means for identifying content to be displayed including authorization to view the content by the a user in the environment; means for determining proximity of the assigned surface to the user to view the projection, the determining proximity using an image of the environment captured by a camera in the environment, the image to identify a position and orientation of the user with respect to the camera and to the plurality of surfaces in the environment; and means for identifying preferences of the user stored in a database with respect toy viewability parameters.

In Example 46, the subject matter of Example 45 optionally includes means for capturing the image by the camera.

In Example 47, the subject matter of any one or more of Examples 45-46 optionally include means for projecting the content on the assigned surface by a projector in the environment.

In Example 48, the subject matter of any one or more of Examples 45-47 optionally include wherein the projectability ranking includes criteria selected from the group consisting of: user position and orientation with respect to the surface, lighting conditions, reflectivity of the surface, line of sight occlusions of the surface, and readability from perspective of the user.

In Example 49, the subject matter of any one or more of Examples 45-48 optionally include means for assigning an input device as an assigned input device for the user to provide commands or feedback, wherein the assigned input device is one of a touch surface in the environment or an alternative device.

In Example 50, the subject matter of Example 49 optionally includes wherein assigning the input device is based on a touchability ranking of a plurality of touch surfaces in the environment, availability of the alternative device, and preferences of the user stored in the database.

In Example 51, the subject matter of any one or more of Examples 45-50 optionally include means for identifying a location of the user in the environment; means for determining whether the user is proximate to another user, where proximate users form a cluster; means for determining whether the cluster is a group, wherein the group includes members authorized to view a same projection; and means for assigning the surface for projection, to include user preferences of users in the group, when detecting presence of the group in the environment.

In Example 52, the subject matter of Example 51 optionally includes means for identifying a cluster of users and location of the cluster in the environment using signals captured by at least one of the camera or a microphone.

In Example 53, the subject matter of any one or more of Examples 51-52 optionally include means for determining that there is more than one group in the environment; means for assigning a first surface to a first group, based on projectability of the first surface and user preferences of members of the first group, and proximity of the first surface to both the first and second group; means for assigning a second surface to a second group, based on projectability of the second surface and user preferences of members of the second group, and proximity of the second surface to both the first and second group.

In Example 54, the subject matter of any one or more of Examples 45-53 optionally include means for accessing audio signals from a microphone; and means for detecting speech within the audio signals captured by the microphone using automatic speech recognition and natural language processing, wherein the detected speech is to assist in identification of whether users in a cluster are members of a group.

In Example 55, the subject matter of any one or more of Examples 45-54 optionally include means for determining whether elements of at least one of the environment or identified groups has changed, resulting in change information; and means for responsive to a determined change, determining whether a projection surface is to be reassigned, based on the change information.

Example 56 is a system configured to perform operations of any one or more of Examples 1-55.

Example 57 is a method for performing operations of any one or more of Examples 1-55.

Example 58 is at least one machine readable storage medium including instructions that, when executed by a machine cause the machine to perform the operations of any one or more of Examples 1-55.

Example 59 is a system comprising means for performing the operations of any one or more of Examples 1-55.

The techniques described herein are not limited to any particular hardware or software configuration; they may find applicability in any computing, consumer electronics, or processing environment. The techniques may be implemented in hardware, software, firmware or a combination, resulting in logic or circuitry which supports execution or performance of embodiments described herein.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural, declarative, and/or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product, also described as a computer or machine accessible or readable medium that may include one or more machine accessible storage media having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, smart phones, mobile Internet devices, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments, cloud environments, peer-to-peer or networked microservices, where tasks or portions thereof may be performed by remote processing devices that are linked through a communications network.

A processor subsystem may be used to execute the instruction on the machine-readable or machine accessible media. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Examples, as described herein, may include, or may operate on, circuitry, logic or a number of components, modules, system, subsystems, or mechanisms modules, logic or subsystems, etc., may be hardware, software, or firmware communicatively coupled to one or More processors in order to carry out the operations described herein. To simplify the description herein, the terms logic, modules, and subsystem may be used interchangeably. It will be understood that the modules or logic may be implemented in a hardware component or device, software or firmware running on one or more processors, or a combination. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures. As such, modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the Whole or part of one or more computer systems (e.g., a standalone, client or server computer system) or one or more hardware processors may be configured, or arranged, by firmware or software (e.g., instructions, an application portion, or an application) as a module that operates to perform specified operations. In an example, the software may reside as instructions and data on a machine-readable storage medium. In an example, the software, when executed by the underlying hardware of the module (e.g., machine), causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured, arranged or adapted by using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

While this subject matter has been described with reference to illustrative embodiments, this description is not intended to be construed in a limiting or restrictive sense. For example, the above-described examples (or one or more aspects thereof) may be used in combination with others. Other embodiments may be used, such as will be understood by one of ordinary skill in the art upon reviewing the disclosure herein. The Abstract is to allow the reader to quickly discover the nature of the technical disclosure. However, the Abstract is submitted with the understanding that it will not be used to interpret or limit the scope or meaning of the claims.

What is claimed is:

1. A system for context aware projection in an environment, comprising:
    a processor, when in operation, communicatively coupled to:
        a camera in the environment, and a database for storing user preferences; and
        surface mapping logic coupled to the processor, the surface mapping logic to access an image corresponding to a user in the environment, the image to identify a position of the user with respect to the camera and to a plurality of possible display surfaces in the environment, wherein each possible display surface has an associated projectability ranking, the surface mapping logic to select a display surface of the plurality of possible display surfaces in the environment as an assigned surface, the assigned surface to be used in projection, wherein the assigned surface is selected based on the projectability ranking for the assigned surface with respect to projectability ranking of other surfaces in the environment, and wherein selection of the assigned surface is further based on preferences of the user stored in the database as user preferences, wherein the user preferences include at least one of a preferred display surface, preferred method for providing control and feedback input, preferred privacy settings, preferred height of the display surface, preferred device for display, user audio signature, or preferred handedness,
    wherein the surface mapping logic is further to assign a touchability ranking for each of the plurality of display surfaces, and wherein selection of the assigned surface is based on the touchability ranking in combination with the projectability ranking and the user preferences.

2. The system as recited in claim 1, wherein the selection of the assigned surface is further based on content to be displayed and proximity of the assigned surface to the user to view the projection.

3. The system as recited in claim 1, wherein the projectability ranking includes criteria selected from the group consisting of: user position and orientation with respect to the surface, lighting conditions, reflectivity of the surface, line of sight occlusions of the surface, and readability from perspective of the user.

4. The system as recited in claim 1, wherein the surface mapping logic is further to assign an input device as an assigned input device for the user to provide commands or feedback to the context aware projection system, wherein the assigned input device is one of a touch surface in the environment or an alternative device, wherein the alternative device is to accept at least one of touch or audio input, wherein to assign an input device is based on a touchability ranking of a plurality of touch surfaces in the environment, availability of the alternative device, and preferences of the user stored in the database.

5. The system as recited in claim 1, further comprising group detection logic coupled to the processor, to identify a location of the user in the environment and determine whether the user is proximate to another user, where proximate users form a cluster, the group detection logic to determine whether the cluster is a group, wherein the group includes members authorized to view a same projection, and when detecting presence of the group in the environment, include user preferences of users in the group when assigning the surface for projection.

6. The system as recited in claim 5, wherein the group detection logic is to use signals captured by at least one of the camera or a microphone to identify a cluster of users and location of the cluster in the environment.

7. The system as recited in claim 6, further comprising conversation detection logic to access audio signals from the microphone, the conversation detection logic further to detect speech within the audio signals using automatic speech recognition and natural language processing, wherein the detected speech is to assist in identification of whether users in a cluster are members of a group.

8. The system as recited in claim 7, wherein the conversation detection logic is to identify a conversation within the group, and based on the conversation, to identify a leader of the group, and weight the leader's preferences more heavily than other users' preferences, in assigning at least one of the projection surface and a touch surface for input.

9. The system as recited in claim 5, further comprising change logic coupled to the surface mapping logic to determine whether elements of at least one of the environment or identified groups has changed, the change logic to provide change information to the surface mapping logic to prompt the surface mapping logic to determine whether a projection surface is to be reassigned, based on the change information.

10. The system as recited in claim 5, wherein responsive to the group detection logic having determined that there is more than one group in the environment, the surface mapping logic to assign a first surface to a first group and to assign a second surface to a second group, wherein to assign the first surface depends on projectability of the first surface and user preferences of members of the first group, and proximity of the first surface to both the first and second group, and wherein to assign the second surface depends on projectability of the second surface and user preferences of members of the second group, and proximity of the second surface to both the first and second group.

11. A method for context aware projection in an environment, comprising:
  selecting a surface of a plurality of possible display surfaces in the environment as an assigned surface, wherein each possible display surface has an associated projectability ranking, the assigned surface to be used in projection, wherein selecting the surface further comprises:
    identifying the projectability ranking for the assigned surface with respect to projectability ranking of other surfaces in the environment,
    assigning a touchability ranking of each of the plurality of possible display surfaces, identifying content to be displayed including authorization to view the content by a user in the environment,
    determining proximity of the assigned surface to the user to view the projection, the determining proximity using an image of the environment captured by a camera in the environment, the image to identify a position and orientation of the user with respect to the camera and to the plurality of surfaces in the environment,
    identifying preferences of the user stored in a database with respect to viewability parameters, as user preferences, wherein the user preferences include at least one of a preferred display surface, preferred method for providing control and feedback input, preferred privacy settings, preferred height of the display surface, preferred device for display, user audio signature, or preferred handedness, and
    determining the assigned surface based on at least one of the user preferences, content to be displayed, surface projectability ranking, touchability ranking, and proximity of the user to the assigned surface.

12. The method as recited in claim 11, further comprising projecting the content on the assigned surface by a projector in the environment.

13. The method as recited in claim 11, wherein the projectability ranking includes criteria selected from the group consisting of: user position and orientation with respect to the surface, lighting conditions, reflectivity of the surface, line of sight occlusions of the surface, and readability from perspective of the user.

14. The method as recited in claim 11, further comprising:
  assigning an input device as an assigned input device for the user to provide commands or feedback, wherein the assigned input device is one of a touch surface in the environment or an alternative device, wherein assigning the input device is based on a touchability ranking of a plurality of touch surfaces in the environment, availability of the alternative device, and preferences of the user stored in the database.

15. The method as recited in claim 11, further comprising:
  identifying a location of the user in the environment;
  determining whether the user is proximate to another user, where proximate users form a cluster;
  determining whether the cluster is a group, wherein the group includes members authorized to view a same projection; and
  when detecting presence of the group in the environment, including user preferences of users in the group when assigning the surface for projection.

16. The method as recited in claim 15, further comprising:
  identifying a cluster of users and location of the cluster in the environment using signals captured by at least one of the camera or a microphone.

17. The method as recited in claim 15, further comprising:
  determining that there is more than one group in the environment;
  assigning a first surface to a first group, based on projectability of the first surface and user preferences of members of the first group, and proximity of the first surface to both the first and second group; and
  assigning a second surface to a second group, based on projectability of the second surface and user preferences of members of the second group, and proximity of the second surface to both the first and second group.

18. The method as recited in claim 11, further comprising:
  accessing audio signals from a microphone; and detecting speech within the audio signals captured by the microphone using automatic speech recognition and natural language processing, wherein the detected speech is to assist in identification of whether users in a cluster are members of a group.

19. The method as recited in claim 11, further comprising:

determining whether elements of at least one of the environment or identified groups has changed, resulting in change information; and responsive to a determined change, determining whether a projection surface is to be reassigned, based on the change information.

20. At least one non-transitory computer readable storage medium having instructions stored thereon, the instructions when executed on a machine cause the machine to:

select a surface of a plurality of possible display surfaces in the environment as an assigned surface, wherein each possible display surface has an associated projectability ranking, the assigned surface to be used in projection, wherein selecting the surface further comprises instructions to:

identify the projectability ranking for the assigned surface with respect to projectability ranking of other surfaces in the environment, identify content to be displayed including authorization to view the content by a user in the environment, determine proximity of the assigned surface to the user to view the projection, the determining proximity using an image of the environment captured by a camera in the environment, the image to identify a position and orientation of the user with respect to the camera and to the plurality of surfaces in the environment, assign a touchability ranking for each of the plurality of possible display surfaces, identify preferences of the user stored in a database with respect to viewability parameters, as user preferences, wherein the user preferences include at least one of a preferred display surface, preferred method for providing control and feedback input, preferred privacy settings, preferred height of the display surface, preferred device for display, user audio signature, or preferred handedness, and determine the assigned surface based on at least one of the user preferences, content to be displayed, surface projectability ranking, the touchability ranking, and proximity of the user to the assigned surface.

21. The medium as recited in claim 20, further comprising instructions to project the content on the assigned surface by a projector in the environment.

22. The medium as recited in claim 20, wherein the projectability ranking includes criteria selected from the group consisting of: user position with respect to the surface, user orientation with respect to the surface, lighting conditions, reflectivity of the surface, line of sight occlusions of the surface, and readability from perspective of the user.

23. The medium as recited in claim 20, further comprising instructions to:

assign an input device as an assigned input device for the user to provide commands or feedback, wherein the assigned input device is one of a touch surface in the environment or an alternative device, wherein assigning the input device is based on a touchability ranking of a plurality of touch surfaces in the environment, availability of the alternative device, and preferences of the user stored in the database.

24. The medium as recited in claim 20, further comprising instructions to:

identify a location of the user in the environment:

determine whether the user is proximate to another user, where proximate users form a cluster;

determine whether the cluster is a group, wherein the group includes members authorized to view a same projection; and when detecting presence of the group in the environment, include user preferences of users in the group when assigning the surface for projection.

25. The medium as recited in claim 20, further comprising instructions to:

determine that there is more than one group in the environment:

assign a first surface to a first group, based on projectability of the first surface and user preferences of members of the first group, and proximity of the first surface to both the first and second group; and assign a second surface to a second group, based on projectability of the second surface and user preferences of members of the second group, and proximity of the second surface to both the first and second group.

* * * * *

UNITED STATES PATENT AND TRADEMARK OFFICE
CERTIFICATE OF CORRECTION

PATENT NO. : 10,511,818 B2
APPLICATION NO. : 15/472497
DATED : December 17, 2019
INVENTOR(S) : Raffa et al.

Page 1 of 1

It is certified that error appears in the above-identified patent and that said Letters Patent is hereby corrected as shown below:

In the Claims

In Column 22, Line 24, in Claim 24, delete "environment:" and insert --environment;-- therefor In Column 22, Line 36, in Claim 25, delete "environment:" and insert --environment;-- therefor Signed and Sealed this
Eighteenth Day of August, 2020

Andrei Iancu
*Director of the United States Patent and Trademark Office*